(12) United States Patent
Wang et al.

(10) Patent No.: US 8,474,102 B2
(45) Date of Patent: Jul. 2, 2013

(54) HINGE ASSEMBLY

(75) Inventors: Jin-Xin Wang, Shenzhen (CN); Liang Wei, Shenzhen (CN); Jian Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 762 days.

(21) Appl. No.: 12/548,645

(22) Filed: Aug. 27, 2009

(65) Prior Publication Data

US 2010/0325838 A1 Dec. 30, 2010

(30) Foreign Application Priority Data

Jun. 30, 2009 (CN) .......................... 2009 1 0303881

(51) Int. Cl.
*E05D 3/10* (2006.01)

(52) U.S. Cl.
USPC ............................................. 16/367; 16/337

(58) Field of Classification Search
USPC ................... 16/367, 366, 302, 319, 321, 337, 16/342, 371; 455/575.3; 379/433.13; 361/679.27, 679.06, 679.07; 248/923
See application file for complete search history.

(56) References Cited

U.S. PATENT DOCUMENTS

| 6,883,206 | B2 * | 4/2005 | Yang et al. | 16/337 |
| 7,017,235 | B2 * | 3/2006 | Lu et al. | 16/367 |
| 7,319,749 | B2 * | 1/2008 | Lu et al. | 379/433.13 |
| 7,469,449 | B2 * | 12/2008 | Hsu | 16/367 |
| 7,530,144 | B2 * | 5/2009 | Lu et al. | 16/342 |
| 7,533,449 | B2 * | 5/2009 | Hsu | 16/367 |
| 7,533,450 | B2 * | 5/2009 | Chien | 16/367 |
| 7,555,817 | B2 * | 7/2009 | Hsu et al. | 16/367 |
| 7,574,774 | B2 * | 8/2009 | Chang et al. | 16/367 |
| 7,587,789 | B2 * | 9/2009 | Hsu et al. | 16/367 |
| 7,603,748 | B2 * | 10/2009 | Hsu et al. | 16/367 |
| 7,610,658 | B2 * | 11/2009 | Lee et al. | 16/367 |
| 7,797,797 | B2 * | 9/2010 | Chiang et al. | 16/367 |
| 7,832,058 | B2 * | 11/2010 | Wang et al. | 16/367 |
| 7,979,962 | B2 * | 7/2011 | Lin | 16/367 |
| 7,984,533 | B2 * | 7/2011 | Wei et al. | 16/367 |
| 2007/0130727 | A1 | 6/2007 | Lu et al. | |
| 2007/0174997 | A1 * | 8/2007 | Lu et al. | 16/367 |
| 2008/0034546 | A1 * | 2/2008 | Hsu | 16/367 |
| 2008/0078063 | A1 * | 4/2008 | Chang et al. | 16/367 |

* cited by examiner

*Primary Examiner* — William L. Miller
(74) *Attorney, Agent, or Firm* — Altis Law Group, Inc.

(57) ABSTRACT

A hinge assembly includes a first pivot unit including a shaft, a bracket, an engaging member, a locking member, and an elastic member. The shaft has a non-circular sleeve portion. The bracket is rotatably sleeved on the shaft. The engaging member has a sleeving hole with a shape substantially corresponding to a cross-section of the sleeve portion of the shaft. The locking member has a sleeving hole with a shape substantially corresponding to a cross-section of the sleeve portion of the shaft. The locking member is non-rotatably latched to the engaging member. The elastic member is sleeved on the shaft to resist the components on the shaft.

18 Claims, 4 Drawing Sheets

HINGE ASSEMBLY

BACKGROUND

1. Technical Field

The present disclosure generally relates to hinge assemblies and, particularly, to a hinge assembly for electronic devices.

2. Description of Related Art

Electronic devices such as mobile phones, personal digital assistants, notebooks, and desktop computers with a display device are in widespread use, and consumers may now enjoy the full convenience of high technology products almost anytime and anywhere. The electronic device often includes a main body, a cover, and a hinge assembly to pivotally connect the cover to the main body.

A typical hinge assembly often includes a shaft, a stabilizing member, and a rotary member rotatably engaged with the stabilizing member. The shaft includes a shaft portion having a non-circular cross-section. The rotary member has a shaft hole in a center portion to engage the shaft portion. The shape of the shaft hole corresponds to the cross-section of the shaft portion. However, a gap ineluctably exists between the shaft portion and the rotary member, thus the shaft may move in the shaft hole.

Therefore, a new hinge assembly is desired to overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
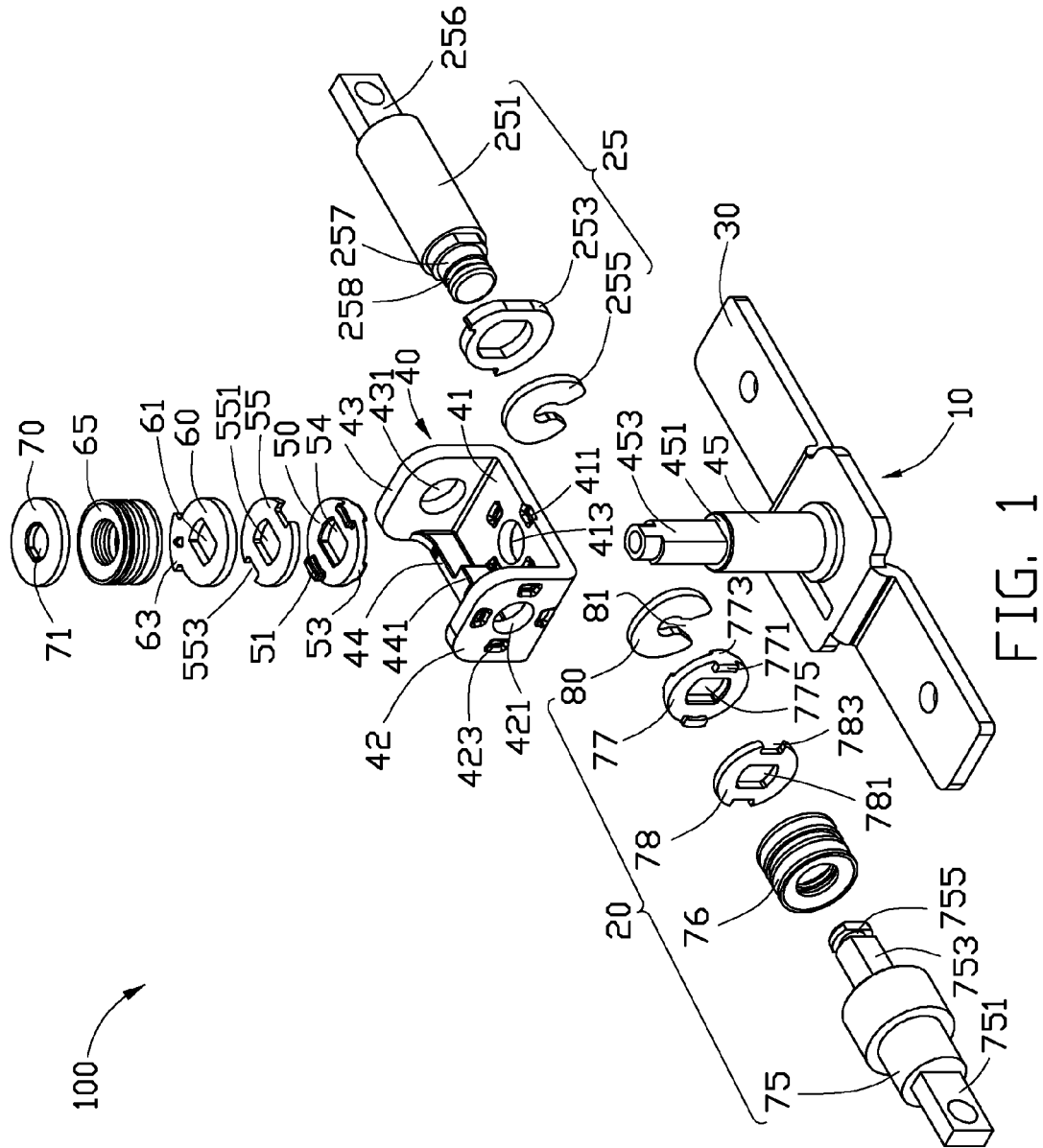
FIG. 1 is an exploded, isometric view of an embodiment of a hinge assembly, the hinge assembly including a shaft.

Referring to FIG. 1, an embodiment of a hinge assembly 100 includes a first pivot unit 10, a second pivot unit 20, and a third pivot unit 25.

The first pivot unit 10 includes a base 30, a bracket 40, a shaft 45, an engaging member 50, a locking member 55, a limiting member 60, an elastic member 65, and a fastening member 70. The second pivot unit 20 includes a first connecting member 75, an elastic member 76, an engaging member 77, a locking member 78, and a fastening member 80. The third pivot unit 25 includes a second connecting member 251, a limiting member 253, and a fastening member 255.

The base 30 can be a substantially rectangular sheet fixed to a main body of an electronic device (not shown). The bracket 40 includes a base portion 41, a first pivot portion 42, a second pivot portion 43, and a limiting portion 44. The first pivot portion 42 and the second pivot portion 43 are formed at opposite ends of the base portion 41. The limiting portion 44 is formed between the first and second pivot portions 42, 43. The base portion 41 defines a plurality of engaging slots 411 and a pivot hole 413 in the center portion. The first pivot portion 42 defines a pivot hole 421 and a plurality of receiving slots 423. The second pivot portion 43 defines a pivot hole 431. The limiting portion 44 has a limiting protrusion 441. In the illustrated embodiment, there are four engaging slots 411 and four receiving slots 423.

The shaft 45 includes a support portion 451 and a sleeve portion 453. The support portion 451 is larger than the sleeve portion 453, thus forming a step surface (not labeled) therebetween. The sleeve portion 453 has a non-circular cross-section. The base portion 41 of the bracket 40 is supported on the step surface of the shaft 45.

The engaging member 50 is substantially disk-shaped. Two latching portions 51 and four catching portions 53 are formed on opposite sides of the engaging member 50. The engaging member 50 defines a non-circular sleeving hole 54 to non-rotatably sleeve on the sleeve portion 453 of the shaft 45. The catching portions 53 are configured to engage the engaging slots 411.

The locking member 55 is substantially disk-shaped. The locking member 55 defines a non-circular sleeving hole 551 to non-rotatably sleeve on the sleeve portion 453 of the shaft 45 and two latching slots 553 to latch the latching portions 51 of the engaging member 50. In the illustrated embodiment, the latching portions 51 is fixed to the latching slots 553 by interference fit, to fix the locking member 55 to the engaging member 50.

The limiting member 60 is substantially disk-shaped and defines a non-circular sleeving hole 61 to non-rotatably sleeve on the sleeve portion 453 of the shaft 45 in the center and forms a limiting flange 63 at a periphery thereof. The elastic member 65 includes a plurality of elastic washers. The fastening member 70 is a washer defining a through hole 71.

Figure 2:
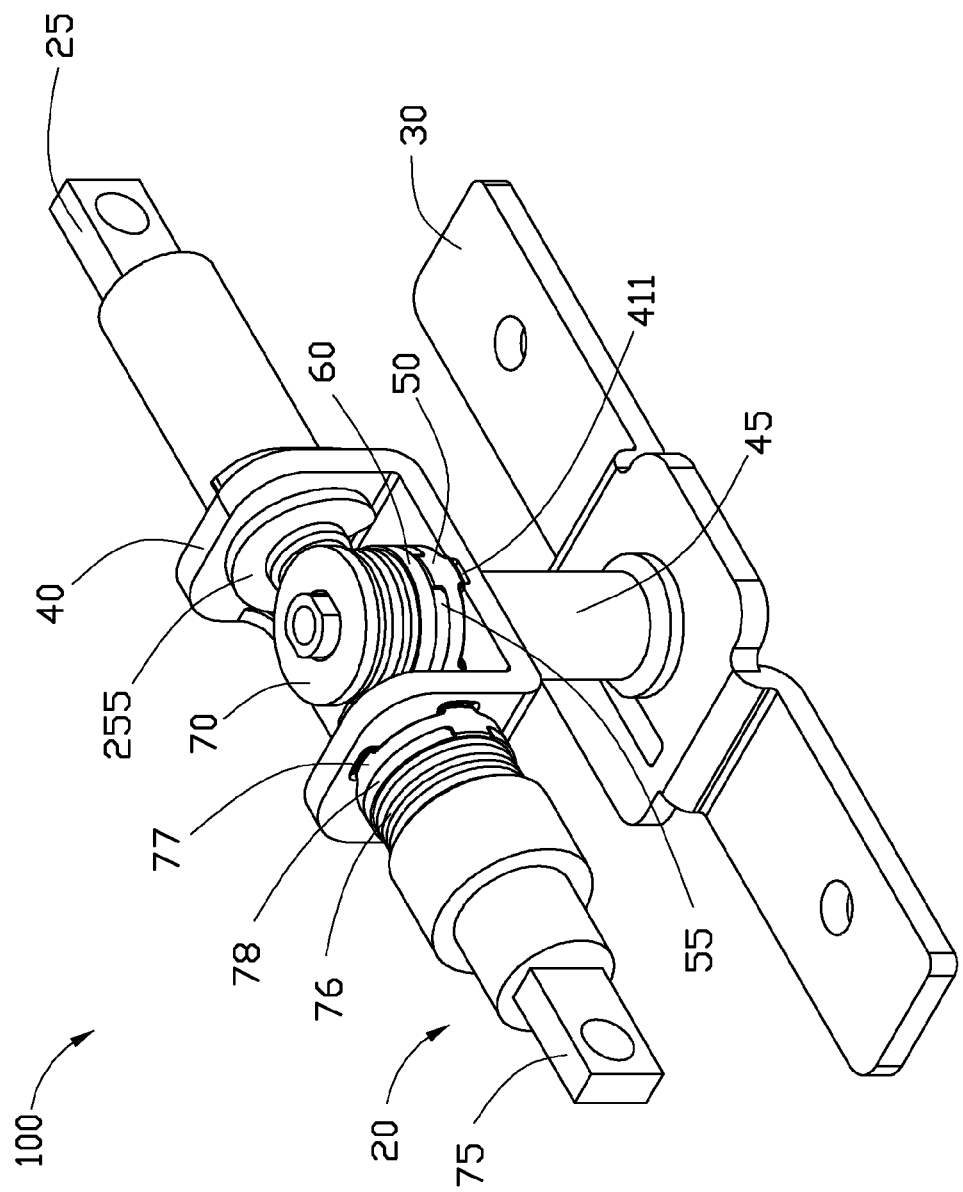
FIG. 2 is an assembled, isometric view of the hinge assembly of FIG. 1, showing the shaft not riveted.
Figure 3:
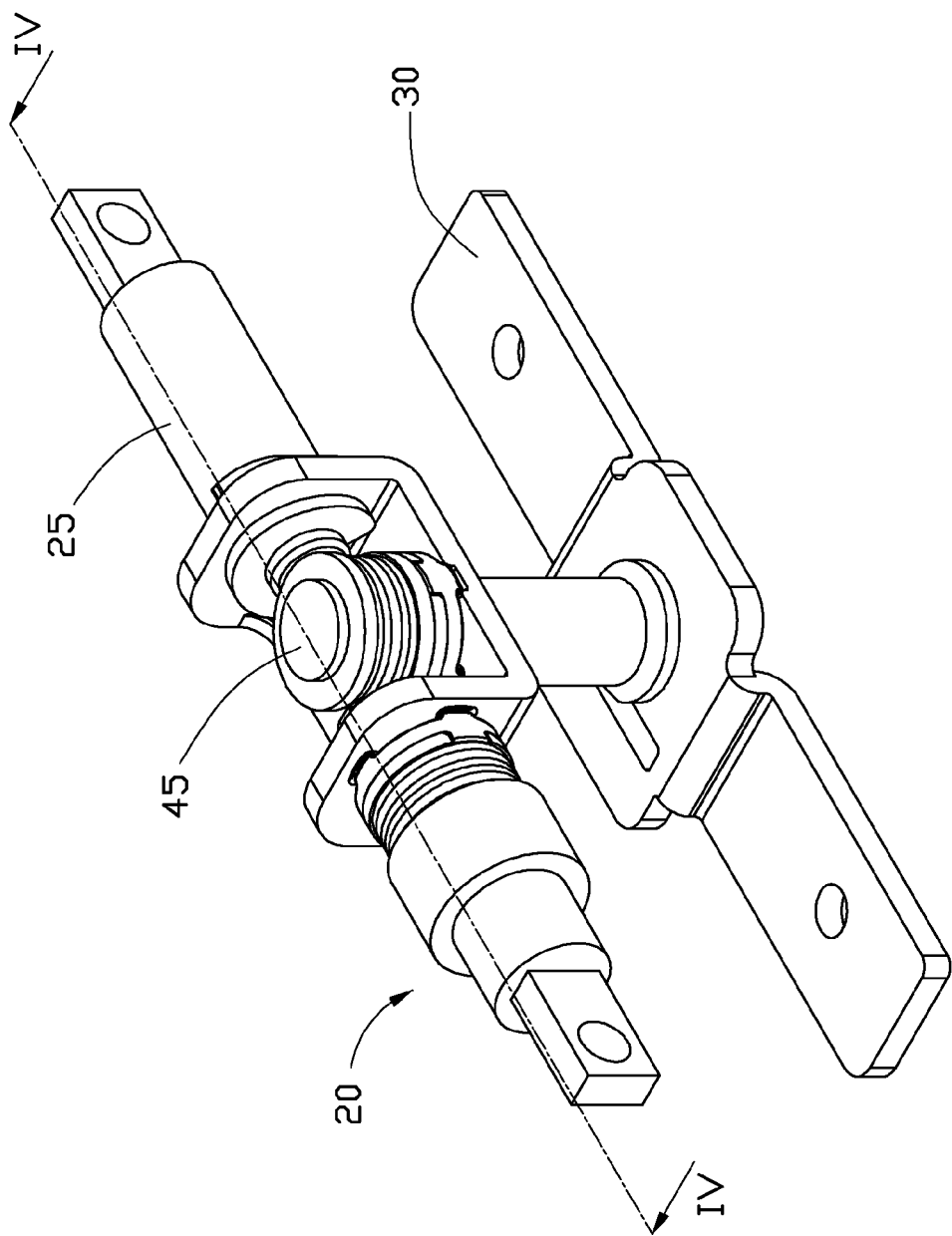
FIG. 3 is an assembled, isometric view of the hinge assembly of FIG. 1, showing the shaft riveted.
Figure 4:
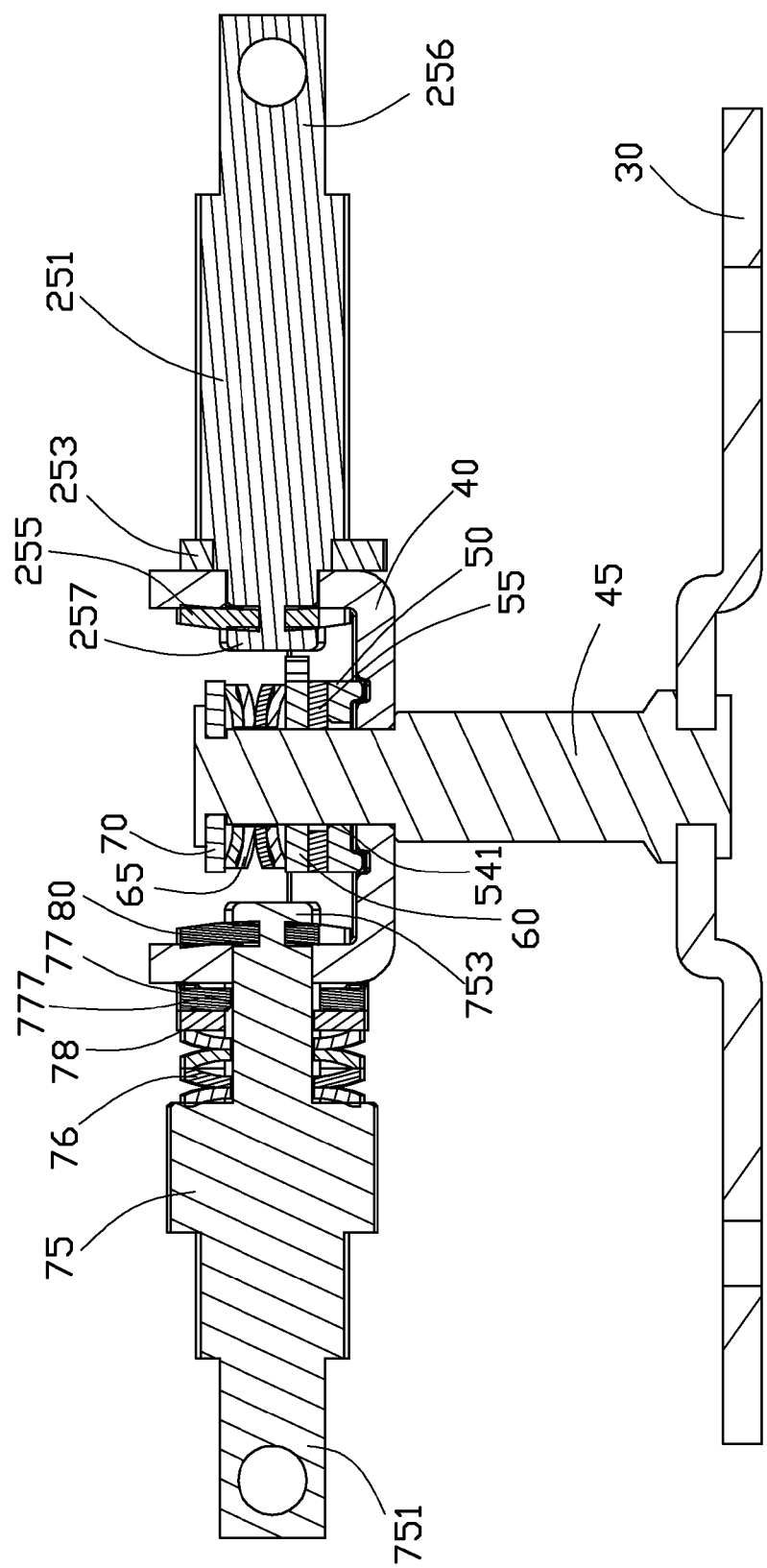
FIG. 4 is a cross-section of the hinge assembly of FIG. 1, taken along line IV-IV of FIG. 3.

Referring to FIG. 2 and FIG. 4, the shaft 45 is fixed to the base 30. The sleeve portion 453 of the shaft 45 passes through the pivot hole 413 of the bracket 40, the sleeving holes 54, 551, 61 of the engaging member 50, the locking member 55, the limiting member 60, the elastic member 65, and the through hole 71 of the fastening member 70. Referring to FIG. 3, an end of the sleeve portion 453 is riveted to prevent the components sleeved on the shaft 45 from disengaging. The base 30, the shaft 45, the engaging member 50, the locking member 55, and the limiting member 60 are non-rotatable relative to each other. The bracket 40 is rotatable relative to the shaft 45. The elastic member 65 is compressed.

The first connecting member 75 includes a first fixing portion 751 and a first shaft portion 753 formed at opposite ends thereof. The first shaft portion 753 defines a first groove 755. The elastic member 76, the engaging member 77 and the locking member 78 have the same structure as the elastic member 65, the engaging member 50 and the locking member 55, respectively. That is, the engaging member 77 has two latching portions 771 and four catching portions 773, and defines a sleeving hole 775. The locking member 78 defines a sleeving hole 781 and two latching slots 783. The fastening member 80 is a C-shaped ring having an opening 81.

The first fixing portion 751 is configured to connect with a cover of the electronic device. The first shaft portion 753 passes through the elastic member 76, the sleeving hole 781 of the locking member 78, the sleeving hole 775 of the engaging member 77, and the pivot hole 421 of the bracket 40. The fastening member 80 engages the first groove 755 of the first connecting member 75. The catching portions 773 of the engaging member 77 engage the receiving slots 423 of the bracket 40. The elastic member 76 is compressed.

The second connecting member 251 includes a second fixing portion 256 and a second shaft portion 257 formed at opposite ends thereof. The second shaft portion 257 defines a second groove 258. The second fixing portion 256 is configured to the cover of the electronic device. The fastening member 255 is a C-shaped ring. The second shaft portion 257 passes through the limiting member 253, and engages the fastening member 255.

When the cover of the electronic device is rotated relative to the main body around the axes of the first connecting member 75 and the second connecting member 251, the first connecting member 75, the engaging member 77, the locking member 78, the limiting member 253, and the second connecting member 251 rotate relative to the first pivot unit 10. The catching portions 773 slide out of the receiving slots 423 and the elastic member 76 is further compressed. Friction force between the components of the second pivot unit 20 maintains the cover in any position during rotation around the axis of first connecting member 75. When the cover rotates through a predetermined angle, the catching portions 773 are received in the receiving slots 423 again to position the cover in the predetermined position.

When the cover of the electronic device is rotated relative to the main body around the axis of the shaft 45, the bracket 40, the second pivot unit 20, and the third pivot unit 25 rotate relative to the shaft 45. The catching portions 53 slide out of the engaging slots 411 and the elastic member 65 is further compressed. A friction force between the components of the first pivot unit 10 maintains the cover in any position during rotation around the axis of the shaft 45. When the cover rotates through a predetermined angle, the catching portions 53 are received in the engaging slots 411 again to position the cover in the predetermined position. A rotation angle of the cover is restricted by engagement of the limiting protrusion 441 and the limiting flange 63.

Since the first pivot unit 10 includes the engaging member 50 and the locking member 55 locked with each other, and each of the engaging member 50 and the locking member 55 has a non-circular sleeving hole to engage the sleeve portion 453 of the shaft 45, the engaging member 50 is prevented from moving on the shaft 45. In the illustrated embodiment, the sleeving hole 551 of the locking member 55 is staggered from the sleeving hole 54 of the engaging member 50, which can be more firmly sleeved on the shaft 45. Similarly, the engaging member 77 is further prevented from moving on the first connecting member 75.

Alternatively, the third pivot unit 25 may be omitted. The fastening members 70, 80, 255 may be replaced by other members, such as nuts.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge assembly, comprising a first pivot unit, the first pivot unit comprising:
    a shaft comprising a non-circular sleeve portion;
    a bracket rotatably sleeved on the shaft;
    an engaging member comprising a sleeving hole with a shape substantially corresponding to a cross-section of the sleeve portion of the shaft;
    a locking member comprising a sleeving hole with a shape substantially corresponding to a cross-section of the sleeve portion of the shaft, and the locking member non-rotatably latched to the engaging member; and
    an elastic member sleeved on the shaft to resist the locking member, the engaging member, and the bracket on the shaft, wherein the locking member and the engaging member are laminated together and resist each other in a vertical direction, a first side wall of the sleeving hole of the locking member and a first side wall of the sleeving hole of the engaging member each resist opposite sides of the sleeve portion of the shaft, a second side wall of the sleeving hole of the locking member opposite to the first side wall thereof and a second side wall of the sleeving hole of the engaging member opposite to the first side wall thereof are each spaced from opposite sides of the sleeve portion of the shaft.

2. The hinge assembly of claim 1, wherein the engaging member forms at least one latching portion, the locking member defines at least one latching slot; the at least one latching portion is fixed to the at least one latching slot by interference fit.

3. The hinge assembly of claim 1, wherein the engaging member forms at least one catching portion; at least one engaging slot is defined in the bracket; the at least one catching portion is received in the at least one engaging slot.

4. The hinge assembly of claim 1, wherein the first pivot unit further comprises a base fixed to the shaft, a limiting member non-rotatably sleeved on the shaft, and a fastening member; the limiting member forms a limiting flange, the bracket forms a limiting protrusion to engage with the limiting flange to restrict a rotation angle between the bracket and the shaft; the fastening member is mounted at an end of the shaft to prevent the elastic member, the limiting member, the locking member, the engaging member and the bracket on the shaft from disengaging.

5. The hinge assembly of claim 1, wherein the bracket comprises a base portion; the shaft passes through the base portion.

6. The hinge assembly of claim 5, wherein the bracket further comprises a first pivot portion defining a pivot hole; the hinge assembly further comprises a second pivot unit comprising an engaging member, a locking member, and a first connecting member; the first connecting member passes through the engaging member, the locking member, and the pivot hole of the first pivot portion of the bracket; an axis of the first connecting member is substantially perpendicular to an axis of the shaft.

7. The hinge assembly of claim 6, wherein the first connecting member comprises a first shaft portion having a non-circular cross-section; the engaging member of the second pivot unit comprises a sleeving hole having a shape substantially corresponding to a cross-section of the first shaft portion of the first connecting member;
    the locking member comprises a sleeving hole having a shape substantially corresponding to a cross-section of the first shaft portion of the first connecting member;
    the locking member of the second pivot unit non-rotatably latches with the engaging member of the second pivot unit.

8. The hinge assembly of claim 7, wherein the engaging member of the second pivot unit forms at least one latching portion; the locking member of the second pivot unit defines at least one latching slot fixed to the at least one latching portion of the second pivot unit by interference fit.

9. The hinge assembly of claim 6, wherein the engaging member of the second pivot unit forms at least one catching portion; the first pivot portion of the bracket defines at least one receiving slot to receive the at least one catching portion of the engaging member of the second pivot unit.

10. The hinge assembly of claim 6, wherein the second pivot unit further comprises an elastic member and a fastening member sleeved on the first shaft portion of the first connecting member.

11. The hinge assembly of claim 10 further comprising a third pivot unit comprising a second connecting member, a limiting member, and a fastening member; the bracket further comprises a second pivot portion substantially parallel to the first pivot portion; the second connecting member passes through the limiting member, the second pivot portion, and the fastening member.

12. A hinge assembly, comprising a first pivot unit comprising:
- a shaft comprising a sleeve portion;
- a bracket rotatably sleeved on the shaft;
- an engaging member non-rotatably sleeved on the sleeve portion of the shaft, the engaging member forming at least one latching portion; and
- a locking member non-rotatably sleeved on the sleeve portion of the shaft, and the locking member defining at least one latching slot fixed to the at least one latching portion by interference fit, such that the locking member non-rotatably latched latches to the engaging member, wherein the first pivot unit further comprises a base fixed to the shaft, a limiting member non-rotatably sleeved on the shaft, a fastening member fixed on the shaft, and an elastic member sleeved on the shaft; the limiting member forms a limiting flange; the bracket forms a limiting protrusion engaging with the limiting flange to restrict a rotation angle between the bracket and the shaft; the fastening member is mounted at an end of the shaft to prevent the elastic member, the limitation member, the locking member, the engaging member and the bracket on the shaft from disengaging.

13. The hinge assembly of claim 12, wherein the locking member and the engaging member are laminated together and resist each other in a vertical direction, and a side wall of the sleeving hole of the locking member and a side wall of the sleeving hole of the engaging member resist opposite sides of the sleeve portion of the shaft.

14. The hinge assembly of claim 12, wherein the engaging member forms at least one catching portion; the bracket defines at least one engaging slot to receive the at least one catching portion of the engaging member.

15. The hinge assembly of claim 12, wherein the bracket comprises a base portion and a first pivot portion; the shaft passes through the base portion of the bracket; the first pivot portion defines a pivot hole; the hinge assembly further comprises a second pivot unit comprising an engaging member, a locking member, and a first connecting member; the first connecting member passes through the engaging member, the locking member and the pivot hole of the first pivot portion of the bracket;
- the engaging member and the locking member of the first pivot unit are substantially non-rotatable relative to the first connecting member; the locking member and the engaging member of the first pivot portion are non-rotatably latched to each other; an axis of the first connecting member is substantially perpendicular to an axis of the shaft.

16. The hinge assembly of claim 15, wherein the engaging member of the second pivot unit forms at least one latching portion; the locking member of the second pivot unit defines at least one latching slot fixed to the at least one latching portion of the second pivot unit by interference fit; the engaging member of the second pivot unit forms at least one catching portion; the first pivot portion of the bracket defines at least one receiving slot to receive the at least one catching portion of the engaging member of the second pivot unit.

17. The hinge assembly of claim 16, wherein the second pivot unit further comprises an elastic member and a fastening member sleeved on the first shaft portion of the first connecting member.

18. A hinge assembly, comprising a first pivot unit, the first pivot unit comprising:
- a shaft comprising a non-circular sleeve portion;
- a bracket rotatably sleeved on the shaft;
- an engaging member comprising a sleeving hole with a shape substantially corresponding to a cross-section of the sleeve portion of the shaft;
- a locking member comprising a sleeving hole with a shape substantially corresponding to a cross-section of the sleeve portion of the shaft, and the locking member non-rotatably latched to the engaging member; and
- an elastic member sleeved on the shaft to resist the locking member, the engaging member, and the bracket on the shaft, wherein the bracket comprises a base portion and a first pivot portion defining a pivot hole; the shaft passes through the base portion, the hinge assembly further comprises a second pivot unit comprising an engaging member, a locking member, and a first connecting member; the first connecting member passes through the engaging member, the locking member, and the pivot hole of the first pivot portion of the bracket; an axis of the first connecting member is substantially perpendicular to an axis of the shaft.

* * * * *